Figure 1:
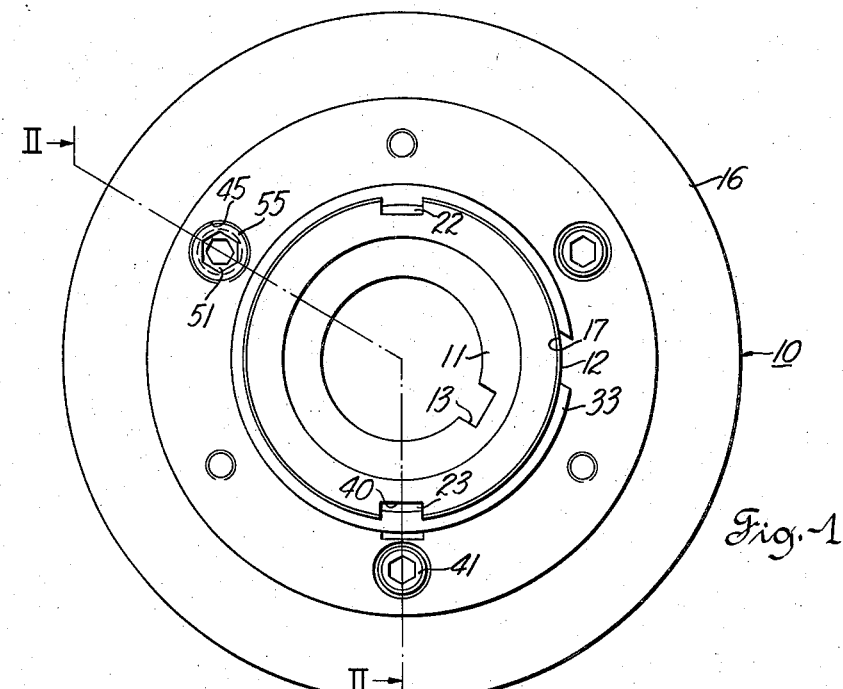

March 7, 1961 P. G. KURRE 2,973,656

VARIABLE PITCH DIAMETER SHEAVE

Filed April 1, 1959

Inventor
Paul G. Kurre
By Robert B. Benson
Attorney

United States Patent Office 2,973,656
Patented Mar. 7, 1961

2,973,656

VARIABLE PITCH DIAMETER SHEAVE

Paul G. Kurre, Cincinnati, Ohio, assignor to Allis-Chalmers Manufacturing Company, Milwaukee, Wis.

Filed Apr. 1, 1959, Ser. No. 803,470

12 Claims. (Cl. 74—230.17)

This invention relates generally to variable pitch diameter sheaves of the type in which opposed frusto-conical disks are axially movable toward and away from each other to vary the effective pitch diameter of the sheave. More specifically this invention relates to means for moving the frusto-conical disks of such a sheave axially relative to each other and to the support member on which they are mounted.

In the adjustable diameter sheave industry many attempts have been made to provide a simple economic structure for moving the conical disks of a sheave relative to each other to vary the pitch diameter of the sheave. Such a mechanism in order to be successful should be easily accessible and able to provide a positive adjustment of the disks. Furthermore, the adjusting mechanism should be capable of locking the sheave disks in their adjusted position. One of the simplest such adjusting mechanisms of the prior art utilizes a plurality of set screws that threadedly engage the hub of the sheave disk and abut the main sleeve on which the disks are mounted. When it is desired to adjust the position of such a disk the set screws are loosened and the disk is moved axially to its new position whereupon the screws are again tightened against the main sleeve to secure the disk in its new position. Such a mechanism requires a large number of operations for adjustment and it is difficult to accurately set the disks for the desired pitch diameter.

Another well known method of adjusting the disk of a variable pitch diameter sheave is to use a simple bolt that threadedly engages one disk and abuts the outside surface of its mate. Such an arrangement is used to move the disks closer together and when it is desired to move the disks apart the bolt is loosened and the belt pressure on adjacent groove defining surfaces is relied upon to move the disks away from each other. A modification of this device utilizes two separate adjusting bolts one of which abuts the outside surface of one disk and threadedly engages the other to draw the disks together and a second adjusting bolt that threadedly engages the first disk and abuts the inside surface of the second to force the disks away from each other. This system in effect has two separate adjusting mechanisms that work together to vary the pitch diameter of the sheave and maintain the sheave disks in their adjusted position.

One of the latest improvements in this field is a mechanism that utilizes a single oppositely threaded adjusting bolt that operatively engages disks of both sets to exert a positive pressure on both disks simultaneously and in opposite directions to thereby effect movement of the disks either toward or away from each other. However, in this arrangement a separate member is anchored to the main sleeve and engaged by the adjusting bolt to provide a means from which thrust may be exerted on the movable disks. In such an arrangement the adjusting bolt threadedly engages the extra member as well as both sets of movable disks and hence the adjusting mechanism is a complicated and expensive device.

The sheave adjusting mechanism of this invention overcomes the disadvantages of the prior art adjusting mechanisms by calling for a single adjusting bolt for both increasing and decreasing the pitch diameter of the sheave. The bolt threadedly engages one of a pair of groove forming disks and has a head that abuts a shoulder in the second of the pair of disks. An axially aligned screw threadedly engages the second disk and is positioned on the outer side of the bolt head. One of the disks is appropriately secured to the main sleeve by any suitable means, such as snap rings to provide a means from which thrust can be applied to the movable disks. The pitch diameter of the sheave is varied by rotating the bolt to slide the movable disk toward or away from the stationary disk. The sheave disks are maintained in their adjusted position by tightening the screw against the head of the bolt.

Therefore it is the object of this invention to provide a new and improved variable pitch diameter sheave.

Another object of this invention is to provide a new and improved pitch diameter adjusting mechanism for sheaves.

Another object of this invention is to provide a pitch diameter adjusting mechanism for sheaves that is simpler in construction, easier to use and more economical than prior art sheave adjusting mechanisms.

Another object of this invention is to provide a new and improved pitch diameter adjusting mechanism for sheaves that is easily accessible and provides a positive thrust in either direction on the movable disks of the sheave.

Another object of this invention is to provide a new and improved pitch diameter adjusting mechanism that also serves to lock the sheave disks in position.

Figure 2:
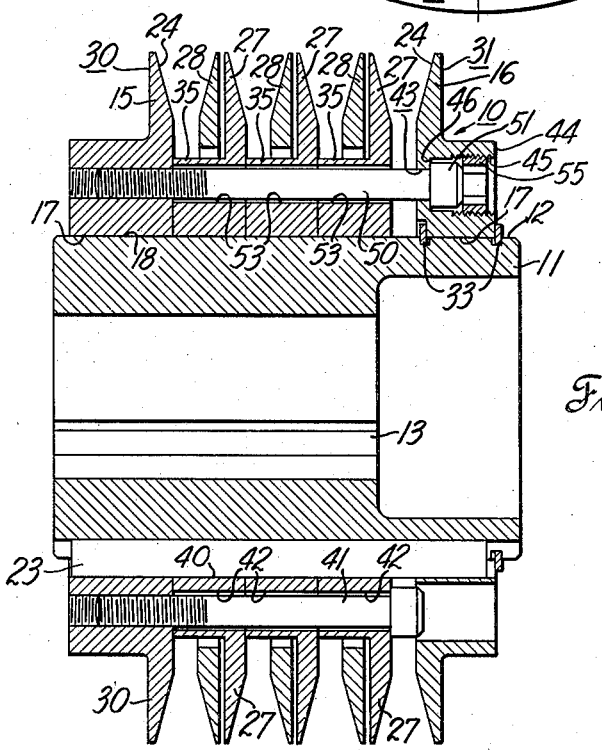

Other objects and advantages of this invention will be apparent when reading the following description in connection with the accompanying drawings, in which:

Fig. 1 is an end view of a variable pitch diameter sheave embodying the adjusting mechanism of this invention; and Fig. 2 is a side view of the sheave taken along the line II—II of Fig. 1.

The illustrated sheave 10 is adapted to be mounted on a suitable power transmission element. The sheave is provided with a support member or sleeve 11 which is adapted to be mounted on a shaft, not shown, by suitable connecting means such as driving keys. The support member 11 preferably has a generally cylindrical external surface 12 and is provided with a longitudinally extending keyway 13 in its interior surface for receiving a driving key.

A series of annularly shaped frusto-conical disk members are mounted on support member 11. Disks 15 and 16 are termed end disks and each is annular in form with a central opening 17 bounded by a substantially continuous bearing surface 18. End disks 15 and 16 have conventional keyways which fit keys 22 and 23, respectively, and have frusto-conical belt engaging surfaces 24 mutually facing each other.

The scope of this invention contemplates a construction utilizing end disks 15 and 16 alone as well as sheave constructions in which the ends disks are utilized with two or more intermediate disks such as 27 and 28. The intermediate disks 27 and 28 also have frusto-conical belt engaging faces, are generally annular in form and are respectively axially spaced from and clamped to their associated end disks 15 and 16 to form two sets 30 and 31 of oppositely facing disks. One set 30 of disks is axially movable as a unit with respect to the other set 31 and to the support member 11. The other set 31 of disks is anchored relative to the support member 11 by any suitable means such as the illustrated snap rings 33. When two or more intermediate disks are utilized the disks of the two sets are alternatively arranged to form cooperating pairs of oppositely facing disks, the faces of one set of disks being movable toward and away from the faces of the other set of disks to increase or decrease the effective pitch diameter of the pulley.

The disks of each set 30, 31 may be spaced and clamped in any of a number of ways well known in the sheave industry. However, a preferred way is illustrated and explained in U.S. Patent 2,658,401, T. C. Knudsen. In the sheave 10 both sets of disks are connected in the same way and Fig. 2 illustrates how set 30 is connected. The intermediate disks 27 are formed with axially extending lugs 35 which are circumferentially spaced so that the lugs on each disk form an annular series. Between the respective lugs of disks 28 are openings for receiving corresponding lugs of an adjacent disk. In assembly the set of lugs on each disk 27 is interdigitated and passes through the openings between the set of lugs on one of the other disks 28. Tie bolts such as 41 pass through suitable holes 42 in the lugs and engage the end disk of their respective set of disks. As illustrated, the head of the bolt 41 engages the outermost intermediate disk 27 and threadedly engages the associated end disk 15 to clamp together the respective disks of set 30 in an integral unit. The set 30 of disks is axially movable in unison relative to the other set 31 of disks and the support member 11. One lug of each intermediate disk 27 or 28 has a keyway 40 aligned with one of the keyways in the end disk 15, 16. The keys 22 or 23 fit into the keyways formed in the disks 27, 28 and the support member 11 to prevent rotation of the respective sets of disks relative to the support member. If more than two intermediate disks are used the keyways 40 in the lugs of each set of disks are aligned with each other so that a continuous keyway is formed in each set 30, 31 for receiving one of the keys 22 or 23 and thereby prevent rotation of the associated set of disks relative to the support member 11.

As was previously mentioned, the end disk 16 of the set 31 of disks is anchored relative to the support member by the snap rings 33. The end disk 16 has a longitudinally extending aperture 43 that is counterbored from the open end 44 of the disk to provide an enlarged aperture 45 and a shoulder 46. An adjusting bolt 50 having an enlarged portion or head 51 is inserted through the aperture 43 in the end disk 16, extends through aligned apertures 53 in each of the intermediate disks 27 of set 30 and threadedly engages end disk 15. The enlarged portion 45 of the aperture in end disk 16 is internally threaded. An externally threaded locking screw 55 threadedly engages the enlarged portion 45 of aperture 43.

The head 51 of the adjusting bolt has a centrally located tool engaging socket, preferably hexagonal for receiving an Allen wrench. The locking screw 55 is annular so as to provide access to the socket in the head of the adjusting bolt. Preferably as shown the radially inner surface of the adjusting screw forms a tool engaging surface preferably hexagonal for receiving an Allen head wrench of a larger size than that used with the socket in the head of the bolt. Although hexagonal openings have been shown in the head 51 and the nut screw 55 for receiving Allen head wrenches, it is obvious that the openings could have other configurations adapted to receive appropriate actuating tools.

In the fully assembled condition all of the disks 15, 16, 27, 28 are mounted on the support member 11 and are properly aligned. End disk 16 is connected to the support member 11 by means of the snap rings 33. Tie bolts 41 are positioned in the apertures formed in the intermediate disks and threadedly engage the associated end disk to clamp the alternate disks in sets 30, 31. The adjusting bolt 50 extends through the aligned apertures 43 and 53 in end disk 16 and intermediate disks 27 and threadedly engages end disk 15. The locking screw 55 operatively engages the threaded surface defining the enlarged aperture 45 in end disk 16 and forceably abuts the head 51 of the adjusting bolt 50 which in turn abuts the shoulder 46 to prevent any rotation of the adjusting bolt relative to the end disk 16. To this end the head 51 of the adjusting bolt 50 should be large enough so that the locking screw engages sufficient surface on the head to assure tight slip free connection.

In operation when it is desired to vary the pitch diameter of the sheave the locking screw 55 is backed off a portion of one turn. This frees the adjusting bolt 50 for rotation relative to the end disk 16. When it is desired to increase the pitch diameter of the sheave the adjusting bolt is rotated in one direction to force the set 30 of disks to move axially toward the end disk 16. Each disk 15 or 27 is moved closer to its associated groove defining disk to thereby increase the pitch diameter of the sheave. When it is desired to decrease the pitch diameter of the sheave the adjusting bolt is rotated in the opposite direction. In this operation the head of the adjusting bolt abuts the locking screw which is stationary relative to the end disk 16 and hence to the support member 11. When the bolt 50 is rotated in this direction, thrust is exerted on the set 30 of disks to move it axially away from the end disk 16. Hence each disk 15 and 27 is moved axially away from its associated groove defining disk 16, 28 to thereby reduce the pitch diameter of the sheave. When the new pitch diameter has been set, the locking nut is rotated until it snugly abuts the head 51 of the adjusting bolt 50 to prevent rotation of the adjusting bolt relative to end disk 16 and thereby fix the pitch diameter of the sheave.

Although but one embodiment of the invention has been illustrated and described, it will be apparent to those skilled in the art that various modifications and changes may be made without departing from the spirit of the invention and the scope of the appended claims.

What I claim is:

1. A variable pitch diameter sheave comprising a support member having a generally cylindrical external surface, first and second annularly shaped disks mounted on said support member, one of said disks being slidable relative to said support member, said disks having longitudinally extending concentric apertures, a portion of the aperture in one of said disks being enlarged to provide a shoulder therein, the surface at the enlarged portion of the aperture in said one disk being threaded, an adjusting bolt extending through the aperture of said one disk and threadedly engaging the other of said disks, said bolt having an enlarged portion positioned to abut said shoulder in said one disk, and an annular screw operatively engaging the threaded portion of said one disk.

2. A variable pitch diameter sheave comprising a support member having a generally cylindrical external surface, first and second annularly shaped disks mounted on said support member, one of said disks being slidable relative to said support member, said disks having longitudinally extending concentric apertures, one of said disks being counterbored from the outside to enlarge said aperture and provide a shoulder therein, the counterbored portion of said one disk being threaded, an adjusting bolt extending through the aperture of said one disk and threadedly engaging the other of said disks, said bolt having a head portion positioned to abut said shoulder in said one disk, and an annular screw threadedly engaging the counterbored portion of said one disk.

3. A variable pitch diameter sheave comprising a support member having a generally cylindrical external surface, first and second annularly shaped disks mounted on said support member, one of said disks being slidable relative to said support member, said disks having longitudinally extending concentric apertures, one of said disks being counterbored from the outside to enlarge said aperture and provide a shoulder therein, the counterbored portion of said one disk being threaded, an adjusting bolt extending through the aperture of said one disk and threadedly engaging the other of said disks, said bolt having a head portion positioned to abut the shoulder portion in said one disk, the end of said head having a tool engaging socket formed therein and an annular screw threadedly engaging the counterbored portion of said one disk, the size of the opening in said screw being larger than said socket in said head whereby the tool for the bolt can be inserted through said annular net into said socket.

4. A variable pitch diameter sheave comprising a support member having a generally cylindrical external surface, first and second annularly shaped disks mounted on said support member, one of said disks being slidable relative to said support member, said disks having longitudinally extending concentric apertures, one of said disks being counterbored from the outside to enlarge said aperture and provide a shoulder therein, the counterbored portion of said one disk being threaded, an adjusting bolt extending through the aperture of said one disk and threadedly engaging the other of said disks, said bolt having a head portion positioned to abut the shoulder portion in said one disk, the end of said head having a tool engaging socket formed therein and an annular screw threadedly engaging the counterbored portion of said one disk, the radially inner surface of said screw defining a tool engaging surface, the size of the opening in said screw being larger than said socket in said head whereby the tool for the bolt can be inserted through said annular nut into said socket.

5. A variable pitch diameter sheave comprising a support member having a generally cylindrical external surface, first and second annularly shaped disks mounted on said support member, one of said disks being slidable relative to said support member, said disks having longitudinally extending concentric apertures, one of said disks being connected to said support member and counterbored from the outside to enlarge said aperture and provide a shoulder therein, the counterbored portion of said one disk being threaded, an adjusting bolt extending through the aperture of said one disk and threadedly engaging the other of said disks, said bolt having a head portion positioned to abut the shoulder portion in said one disk, the end of said head having a tool engaging socket formed therein and an annular screw threadedly engaging the counterbored portion of said one disk, the radially inner surface of said screw defining a tool engaging surface, the size of the opening in said screw being larger than said socket in said head whereby the tool for the bolt can be inserted through said annular nut into said socket.

6. A sheave comprising, a rotatable member, a plurality of frusto-conical disks mounted on said member, said disks cooperating in pairs to form belt engaging grooves, alternate disks being interconnected in sets, one of said sets being axially movable relative to said member and said other set and means for moving said one set of disks comprising a bolt threadedly engaging a disk of one of said sets, said bolt having an enlarged portion for abutting a disk of the other of said sets, said disk of said other set having an aperture defined therein, said aperture being enlarged from one side through a portion of said disk to form an internal shoulder for receiving the enlarged portion of said bolt, the surface of said disks defining said enlarged portion of said aperture being threaded and an annular screw operatively engaging said threaded surface.

7. A sheave comprising, a rotatable member, a plurality of frusto-conical disks mounted on said member, said disks cooperating in pairs to form belt engaging grooves, alternate disks being interconnected in sets, one of said sets being axially movable relative to said member and said other set and means for moving said one set of disks comprising a bolt threadedly engaging a disk of said one set, said bolt having a head portion for abutting the end disk of said other set, said end disk having an axially extending aperture defined therein and being counterbored from the outside to enlarge said aperture and form an internal shoulder for receiving the head portion, the surface of counterbored portion of said end disk being threaded and an annular screw operatively engaging said threaded portion.

8. A sheave comprising, a rotatable member, a plurality of frusto-conical disks mounted on said member, said disks cooperating in pairs to form belt engaging grooves, alternate disks being interconnected in sets, one of said sets being axially movable relative to said member and said other set, and means for moving said one set of disks comprising a bolt threadedly engaging a disk of said one set, said bolt having a head portion for abutting the end disk of said other set, said end disk having an axially extending aperture defined therein and being counterbored from the outside to enlarge said aperture and form an internal shoulder for receiving said head portion, the surface of said counterbored portion of said end disk being threaded, said head portion having a tool engaging socket formed therein and an annular lock screw operatively engaging said threaded portion, the size of the opening in said screw being larger than said socket to provide access to said socket.

9. A sheave comprising, a rotatable member, a plurality of frusto-conical disks mounted on said member, said disks cooperating in pairs to form belt engaging grooves, alternate disks being interconnected in sets, one of said sets being axially movable relative to said member and said other set, and means for moving said one set of disks comprising a bolt threadedly engaging a disk of said one set, said bolt having a head portion for abutting the end disk of said other set, said end disk having an axially extending aperture defined therein and being counterbored from the outside to enlarge said aperture and form an internal shoulder for receiving said head portion, the surface of said counterbored portion of said end disk being threaded, said head portion having a tool engaging socket formed therein and an annular lock screw operatively engaging said threaded portion, the radially inner surface of said screw defining a tool engaging socket, the size of the opening in said screw being larger than said socket to provide access to said socket.

10. A sheave comprising, a rotatable member, a plurality of frusto-conical disks mounted on said member, said disks cooperating in pairs to form belt engaging grooves, alternate disks being interconnected in sets, one of said sets being axially movable relative to said member and said other set, one of the disks of said other set being connected to said support member to restrain movement of said other set relative to said support member, and means for moving said one set of disks comprising a bolt threadedly engaging a disk of said one set, said bolt having a head portion for abutting the end disk of said other set, said end disk having an axially extending aperture defined therein and being counterbored from the outside to enlarge said aperture and form an internal shoulder for receiving the head portion, the surface of counterbored portion of said end disk being threaded and an annular screw operatively engaging said threaded portion.

11. A sheave comprising, a rotatable member, a pair of end disks and plurality of intermediate disks mounted on said member, said disks cooperating in pairs to form belt engaging grooves, alternate disks being interconnected in sets, the first of said sets being axially movable relative to said member and the second of said sets, one of the disks of said second set being connected to said support member and means for moving said first set of disks comprising a bolt, the end disks and the intermediate disks of one of said sets having aligned apertures for receiving said bolt, said bolt threadedly engaging the end disk of said first set and having a head portion for abutting the end disk of said second set, said end disk of said second set being counterbored from the outside to enlarge said aperture therein and form an internal shoulder for receiving said head portion, the surface of said counterbored portion of said end disk being threaded, said head portion having a tool engaging socket formed therein and an annular lock screw operatively engaging said threaded portion, the radially inner surface of said screw defining a tool engaging socket, the size of the opening in said screw being larger than said socket to provide access to said socket.

12. An adjusting mechanism for a variable pitch diameter sheave of the axially movable disk type, comprising an adjusting bolt threadedly engaging one disk and having a head portion abutting an internal shoulder in an oppositely facing disk said shoulder facing away from said one disk and an annular screw operatively engaging said oppositely facing disk and positionable adjacent said head portion of said adjusting bolt whereby the pitch diameter of the sheave may be varied by rotating said adjusting bolt in either direction.

References Cited in the file of this patent

UNITED STATES PATENTS

| | | |
|---|---|---|
| 2,135,467 | Metz | Nov. 1, 1938 |
| 2,697,947 | Firth | Dec. 28, 1954 |